United States Patent [19]

Hirmann

[11] Patent Number: 5,010,969
[45] Date of Patent: Apr. 30, 1991

[54] DRIVE SYSTEM

[76] Inventor: Georg Hirmann, Griesernweg 14, 8037 Zürich, Switzerland

[21] Appl. No.: 163,116

[22] PCT Filed: Jun. 4, 1987

[86] PCT No.: PCT/CH87/00064

§ 371 Date: Feb. 3, 1988

§ 102(e) Date: Feb. 3, 1988

[87] PCT Pub. No.: WO87/07586

PCT Pub. Date: Dec. 17, 1987

Related U.S. Application Data

[63] Continuation-in-part of Ser. No. 129,965, Dec. 4, 1987, which is a continuation of Ser. No. 800,615, Nov. 12, 1985, abandoned.

[30] Foreign Application Priority Data

Jun. 4, 1986 [CH] Switzerland ............ 2266/86
Jun. 25, 1986 [CH] Switzerland ............ 2568/86

[51] Int. Cl.⁵ .............. B62D 57/002; B65G 7/002
[52] U.S. Cl. ............................. 180/8.1; 180/8.5; 254/131; 280/46; 280/47.131; 280/79.11; 414/373; 414/385; 414/786
[58] Field of Search ............ 180/8.1, 8.5; 254/8 R, 254/8 A, 8 B, 131; 198/630; 92/48, 90, 92; 280/46, 47.131, 79.11; 414/373, 787, 786, 385, 481

[56] References Cited

U.S. PATENT DOCUMENTS

| | | | |
|---|---|---|---|
| 2,653,006 | 9/1953 | Lewis | 254/131 |
| 2,874,971 | 2/1959 | Devery | 280/46 |
| 3,680,838 | 8/1972 | Dunn | 254/131 |
| 3,831,691 | 8/1974 | Jenkins | 180/8.1 |
| 3,975,989 | 8/1976 | Hirmann | 92/48 |
| 4,037,739 | 7/1977 | Lee | 414/385 |
| 4,104,425 | 8/1978 | Hirmann | 428/12 |
| 4,121,679 | 10/1978 | March | 180/8.5 |

FOREIGN PATENT DOCUMENTS 379029 8/1923 Fed. Rep. of Germany ...... 254/131

Primary Examiner—Mitchell J. Hill
Attorney, Agent, or Firm—Ostrolenk, Faber, Gerb & Soffen

[57] ABSTRACT

A drive device for driving and/or conveying, guiding and positioning an object in a desired direction by a wedge-type propulsion mechanism. The wedge-type propulsion mechanism represents a new design for a step-by-step conveyor system which can move substantially heavier loads than the systems already known and can perform other functions as well. The device includes a support platform for supporting a load, and an inclined ramp connected to the support platform, the inclined ramp facing in the desired conveying direction. A lifting device can be positioned under the ramp and moved upward to lift the ramp, and with it the support platform. A low coefficient of friction exists between the lifting device and the ramp, preferably provided by a roller, so that as soon as the lifting device lifts the ramp, the ramp slides or rolls along the lifting device in the desired conveying direction while the lifting device remains stationary.

12 Claims, 10 Drawing Sheets

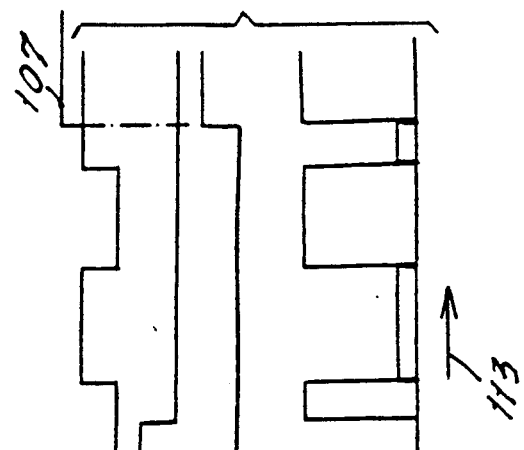
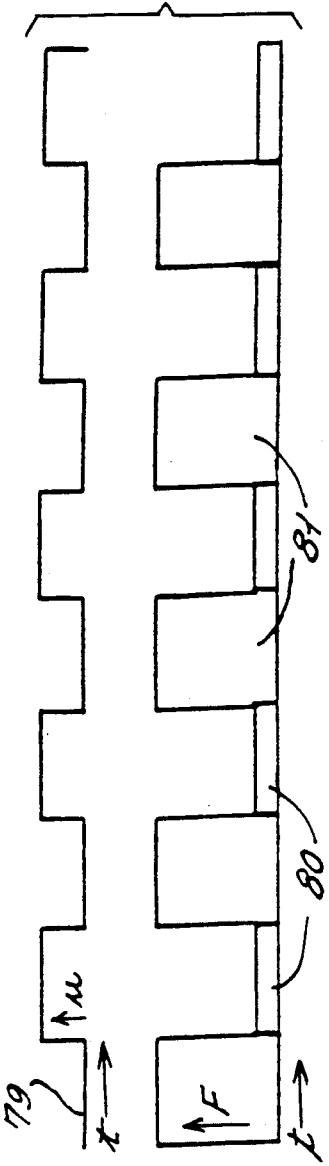
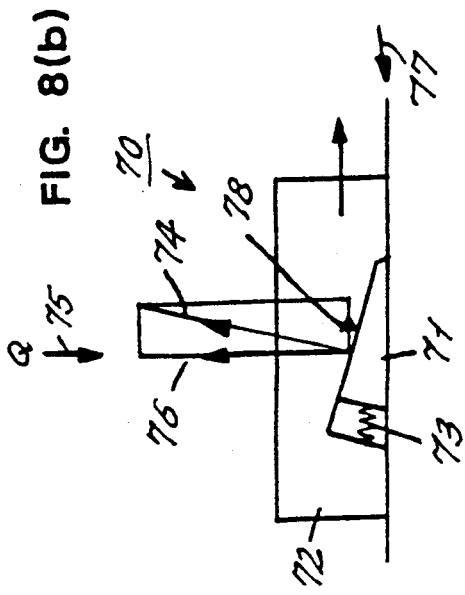
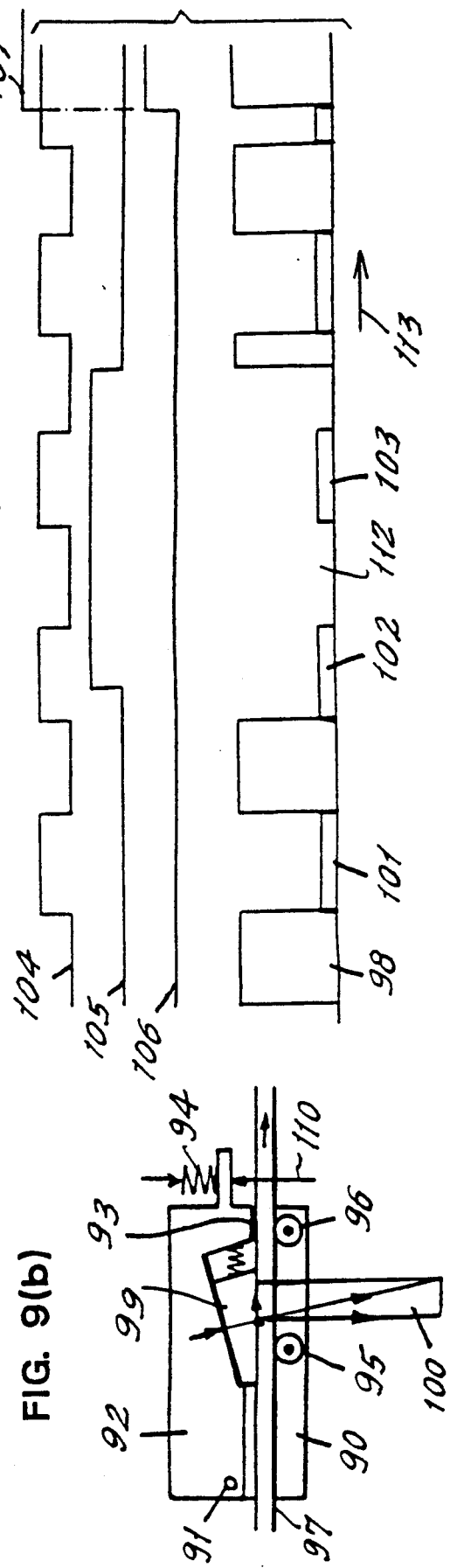

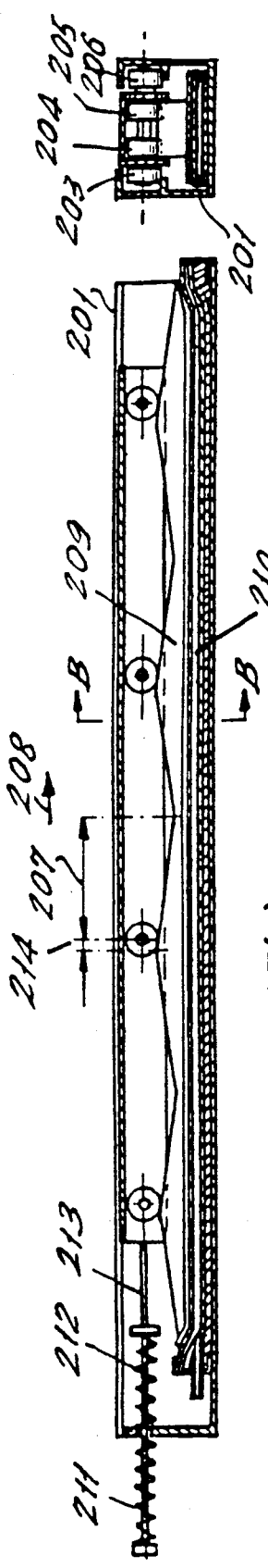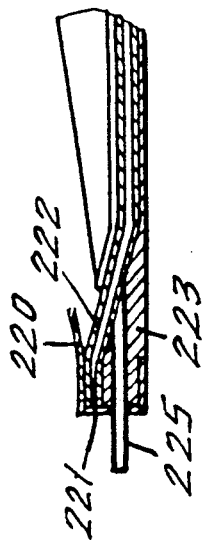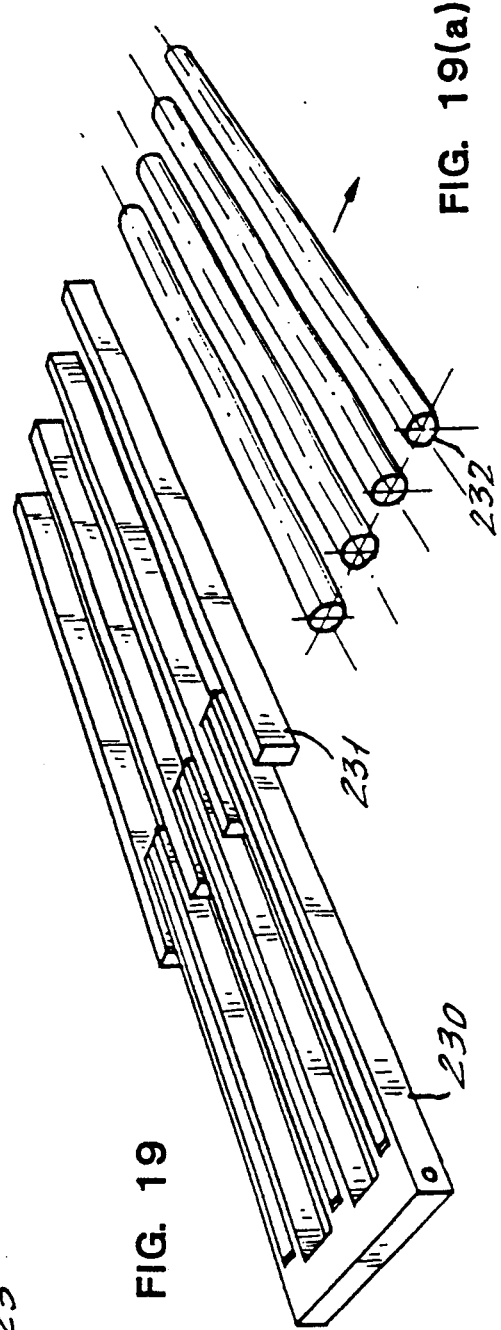

DRIVE SYSTEM

CROSS-REFERENCE TO RELATED APPLICATION

This is a continuation-in-part of U.S. patent application Ser. No. 129,965, filed Dec. 4, 1987, of the same inventor, which is a continuation of Ser. No. 800,615, filed Nov. 12, 1985, now abandoned.

SUMMARY OF THE INVENTION

An active wedge is the converter element of a new mechanism which can be used as a drive system in many different fields.

Means which simplify and/or extend the use of the active to various new applications are described below.

BRIEF DESCRIPTION OF THE DRAWINGS

In the figures:

FIG. 8(a) is a graph showing a timing signal and the binary states of friction which occur during a sliding step, and FIG. 8(b) is a vector diagram showing forces which occur;

FIG. 9(a) is a graph illustrating a controllable step drive, timing signals and frictional states therein, and FIG. 9(b) is a vector diagram showing forces that occur therein;

FIG. 17(a) shows in longitudinal cross-section the functional construction of a conveyor system with hose cell;

FIG. 17(b) is a transverse cross-section taken along line B—B of FIG. 17(a);

FIG. 18 shows an example of the connection of the pressure fluid of a hose cell;

FIG. 19 shows the use of a mobile conveyor system;

FIG. 19(a) shows an alternate use of a mobile conveyor system;

DETAILED DESCRIPTION OF THE ILLUSTRATED EMBODIMENTS

Figure 1:
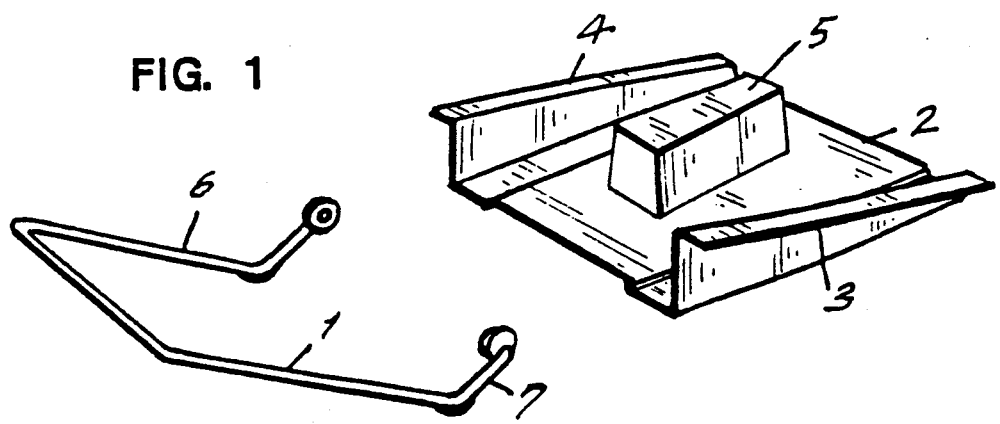
FIG. 1 shows the movement of a load with a mechanical lever.

FIG. 1 shows an extremely simple embodiment of a sliding-step drive having a mechanical lever 1 and a support platform 2 which has ribs 3, 4 and carries a load 5, in accordance with the principles of sliding-step geometry.

The lever arms 6 and 7 have respective act simultaneously on the load 5 via ribs 3 and 4 in straight-line conveying, make it possible also to travel step-wise around curves upon a curved track.

Figure 2:
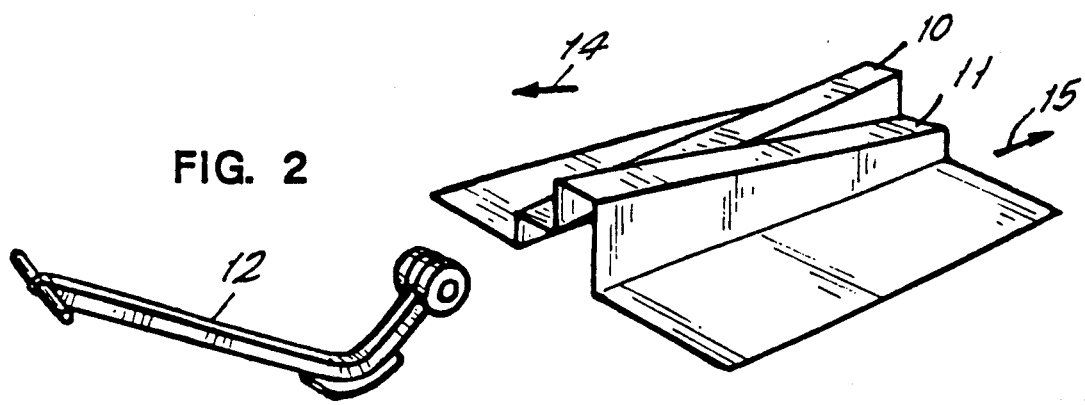
FIG. 2 shows the movement of load with a mechanical lever and two opposing wedge surfaces providing respective directions of movement.
Figure 3:
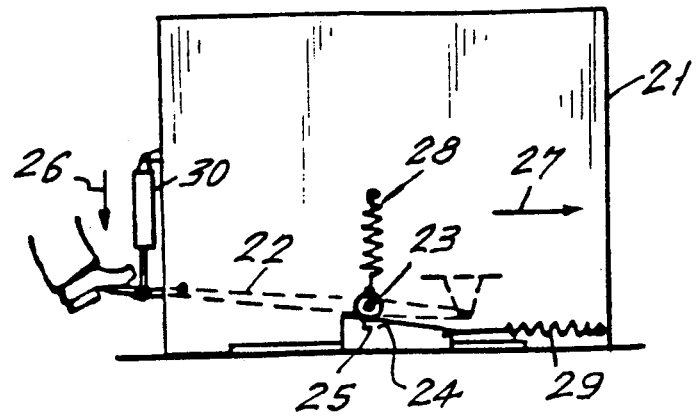
FIG. 3 shows a device for providing repeated stepwise movement of a load by mechanical or pneumatic means.

FIG. 2 shows a platform having ribs 10, 11 which make it possible, by the insertion of the lever 12 in either the rib 10 or the rib 11, move stepwise in the direction 14 or the direction 15 respectively, FIG. 3 shows an advancing device consisting of a part load 21 to be moved in which a lever 22 acts, for instance, via rollers 23 on a U-shaped wedge-thrust body 24 having an inclined roll-down surface 25. By the pressure 26 of the foot, a part of the weight of the load 21 is shifted onto the oblique surface 25 of the wedge-thrust body and the slide step takes place in the direction 27. The repeating of the steps is made possible by the return springs 28 and 29. An alternative for, for instance, pneumatic actuation is a working cylinder 30. A similar auxiliary drive can also be provided via an electric gear motor and eccentric drive (not shown).

Figure 4:
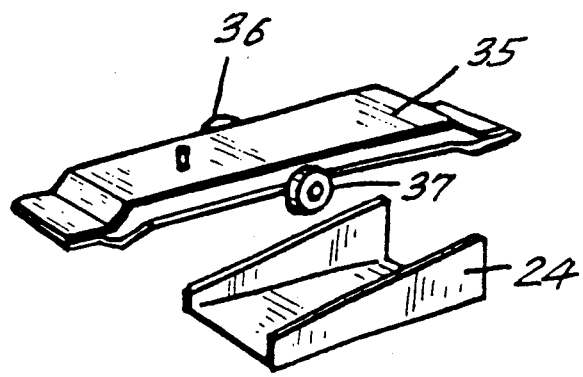
FIG. 4 shows a pressure driven cell with the active wedge for a drive driver.

As shown in FIG. 4, the pneumatic or hydraulic driving of a previously shown U-shaped wedge-thrust member 24 (FIG. 3), there is advantageously used a so-called H cell (Hermann cell) 35, the moved part of which is provided with at least two rollers 36, 37. Such a cell can exert a thrust force in the direction of movement to maintain the shape of the cell. See U.S. Pat. No. 3,975,989 issued Aug. 24, 1976 to the present applicant.

Figure 5:
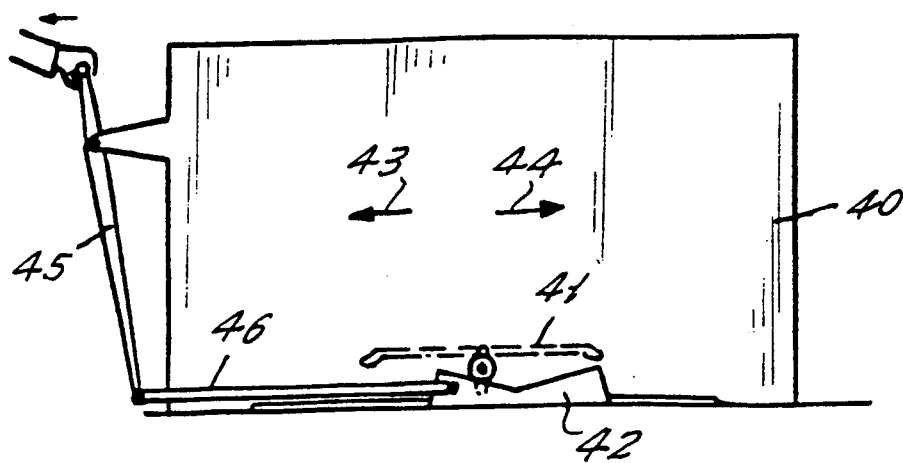
FIG. 5 shows means for the optional forward and backward movement of a load.

FIG. 5 shows a load 40 which is displaceable optionally stepwise either in the direction 43 or the direction 44 by an H cell 41 (same as FIG. 4) via a wedge bidirectional wedge thrust member 42. The direction of advance is determined by the initial location of the wedge-thrust member 42. This initial location is determined here, for instance, manually via the lever 45 and the coupling rod 46.

This manner of initial tensioning permits a sensitive measuring of the length of step. A spring coupling of the initial tensioning permits a bi-stable reversal of the direction of the step (not shown).

Figure 6:
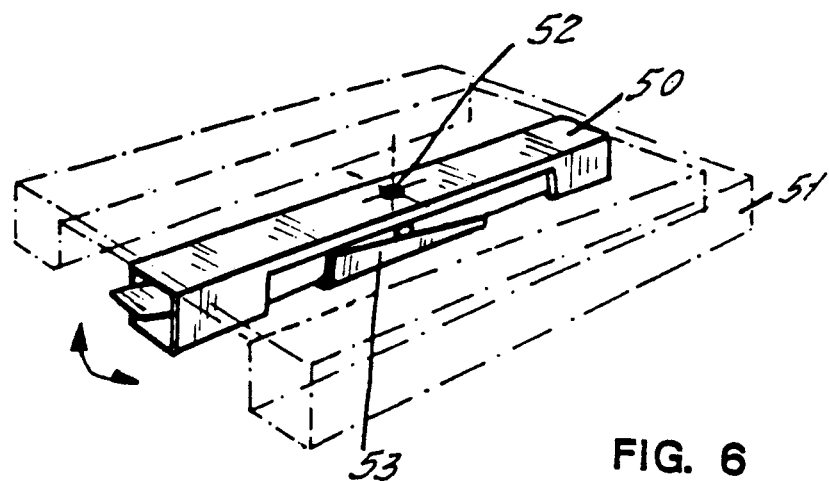
FIG. 6 shows a steerable step-by-step drive.

As shown in FIG. 6 the advancing devices shown in FIGS. 3 and 5 are suitable, for instance, as the central support 50 of a standard palette pallet 51, a container, a consigning vehicle or other movable load (not shown). The active wedge 53, which is pivotally at 52 fastened is freely rotatable, with support 50, in the position of rest, in contradistinction to steerable wheels. As a result, any new directions of movement can be determined when standing, within the range of the turnability which, with suitable arrangement, can also amount to 360°. Such devices can be rapidly coupled to a load, which easily permits their temporary use.

Figure 7:
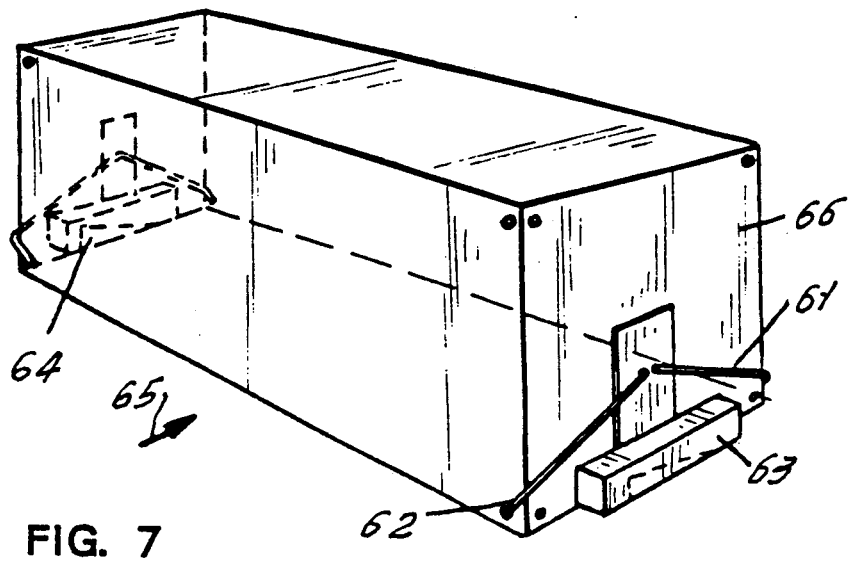
FIG. 7 shows a coupleable pair of sliding-step chassis which may be coupled to a load for the movement thereof.

FIG. 7 shows slide-step mechanisms 63, 64 which can be attached by clamping, for instance via the clamps 61, 62, for the transverse transfer of a standard container 66 between a truck and a path of ramp. The direction or stepping can be determined via a reversible wedge-thrust mechanism (see FIG. 5) or by some other arrangement of the drive modules.

Such connectable drives can move a load by sliding step movements and also position it without having to lift it.

The technique of driving which is based on the active wedge (trademark) has a digital character, in contradistinction to our customary mechanism, in the sense that by the cyclic movement of the active wedge individual digits can be produced stepwise, leg mechanical work.

The individual mechanical digits have a binary character comparable to digital electronics in that they also have "1" and "0" states. The "1" state is produced upon the feeding of energy and the "0" state upon the interruption of the feeding of energy.

FIG. 8 shows, in symbolic form, a sliding step chassis 70 having an active wedge 71, a geometrically fitted load 72, and a return spring 73; and shows the sequence of pulses 79 having an amplitude u from a clock, the degree of frictional resistance during incremental advances at 80, and when at rest, at 81. When power is supplied, for example by a person or by an H-cell as shown for example in FIG. 1 of U.S. Pat. No. 3,975,989, the illustrated vector parallelogram is produced wherein a normal force 74 is produced on the support of the wedge surface component 76 is directed against the load weight 75 of the load 72, and as another component 78 is directed against the floor frictional force 77. The mechanical work necessary to produce the reduced sliding-step friction states, indicated symbolically at 80, is supplied (for instance, microelectronically via a power transistor and a pneumatic three-way valve) during the thrust phase "1" under control of the clock 79. Intermediate states of higher friction are indicated at 81. During the intermediate phases at 81 when the clock level is "0" there occur intervals with the higher frictional forces produced during the state of rest. This controlled series of binary states makes it possible to create a drive technique of high efficiency which in the drive phase only has to overcome a fraction of the frictional force present during the rest phase, and which does not consume energy in the "0" or rest state.

In addition to the binary frictional states described above, the active wedge in this drive technology also offers the a controllable free travel, as possibility of with rapid pulse acceleration of a mounted mass with low losses, as will now be described.

The concept of such a "stepper module" constructed for such purpose is shown in FIG. 9. On a carrier part 90 there has been arranged a housing part 92 which is pivotally fastened thereto at 91 and which in the position of rest is pressed via a brake part 93 by spring 94 against the thrust surface 97 whereon it is guided via rollers 95, 96. In this way there is produced a braked "0" phase 98. In the active phase of the wedge 99, the practically instantaneous release of the brake and the sliding step are produced as illustrated CVD in the vector diagram and as shown in phase 101. If, on the other hand, before or during the process of advance the brake 93 is released by a force 110, there is then produced a free travel phase 112 which is driven via mechanical pulses 102, 103. Once the brake is loaded again, the binary friction sequence is again produced, as indicated at 113. These three controllable conditions of friction, namely self-lock, sliding step and free travel are special parts features of the "H STEP digital mechanism" and can be controlled directly in parallel via three signals 104, 105, 106 and can be stopped, for instance, via an external position sensor or limit switch as indicated schematically at 107.

The brake path of the position precision is obtained with the load lying freely:

$$S = \frac{G \cdot v^2}{2 \cdot G \cdot \mu \cdot g} = \frac{v^2}{2 \cdot \mu \cdot g}$$

Figure 10:
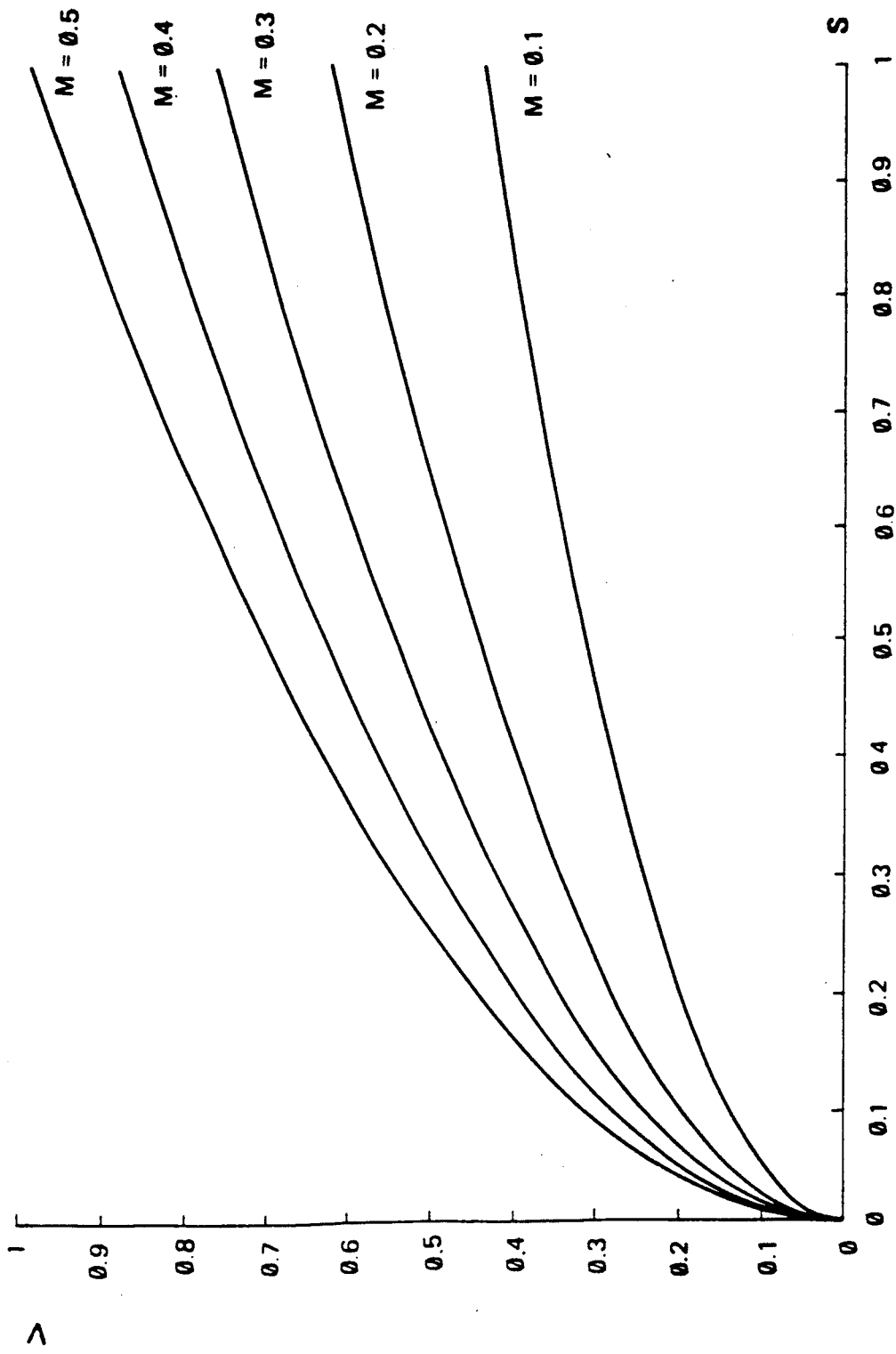
FIG. 10 is a graph of the brake path up to freely resting load.

FIG. 10 shows graphically the relationship between thrust speed and brake path with freely lying load and coefficients of friction of 0.1 to 0.5.

In the "stepper module" with a braking force which is increased as compared with the moved mass G, there is produced a greatly reduced brake path S.

$$S = \frac{G \cdot v^2}{2 \cdot F_B \cdot \mu \cdot g}$$

Figure 11:
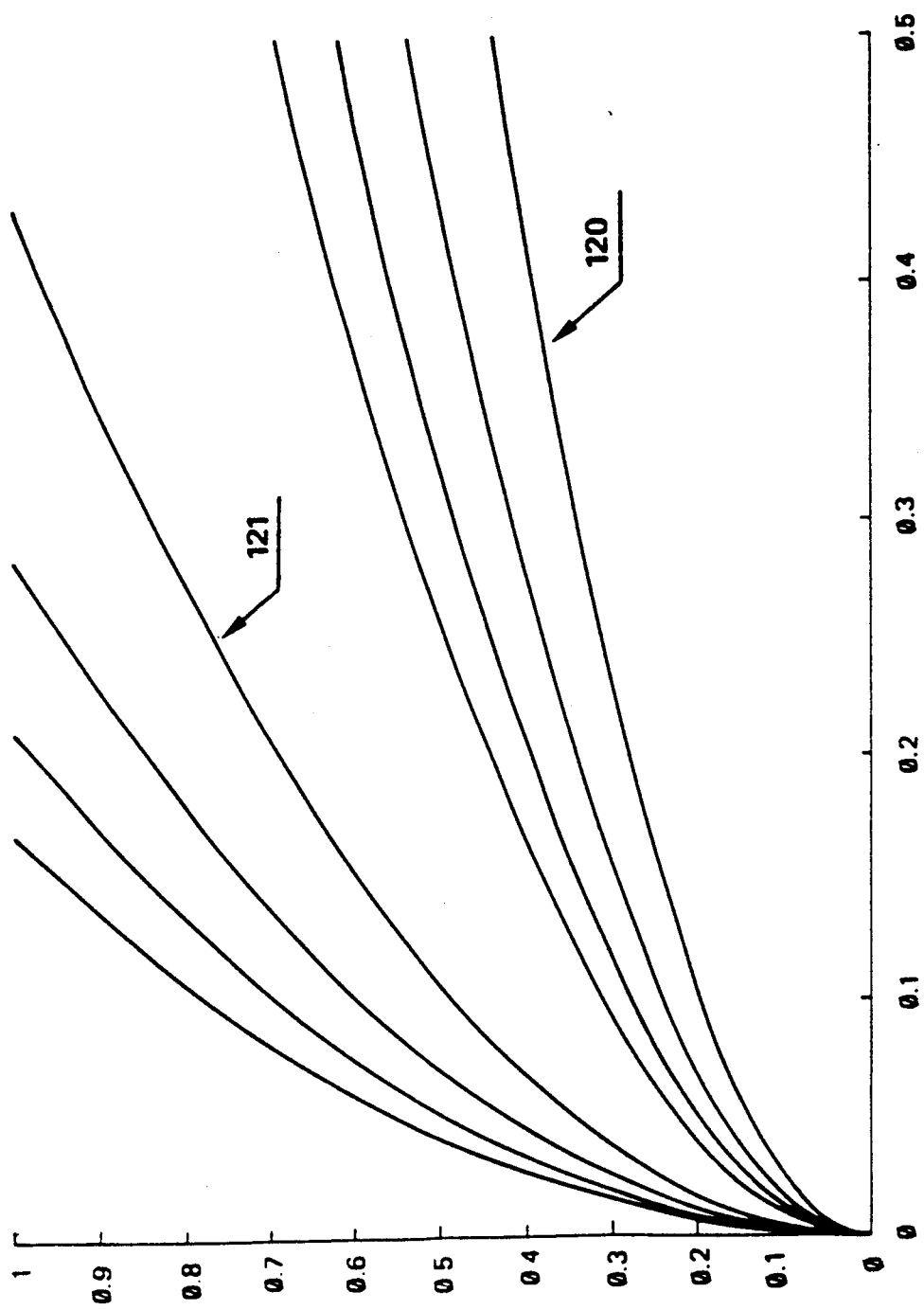
FIG. 11 is the same of FIG. 10 but with the additional showing of the brake path with an application force of 6-G.

FIG. 11 shows the dominant influence of the increased braking force as compared with the moving mass. The four lower curves 120 show the braking process with the freely lying load for $\mu = 0.2, 0.3, 0.4$ and 0.5. The upper four curves 121, on the other hand, show the braking path with a brake application force $F_B$ of 6·G.

Figure 12:
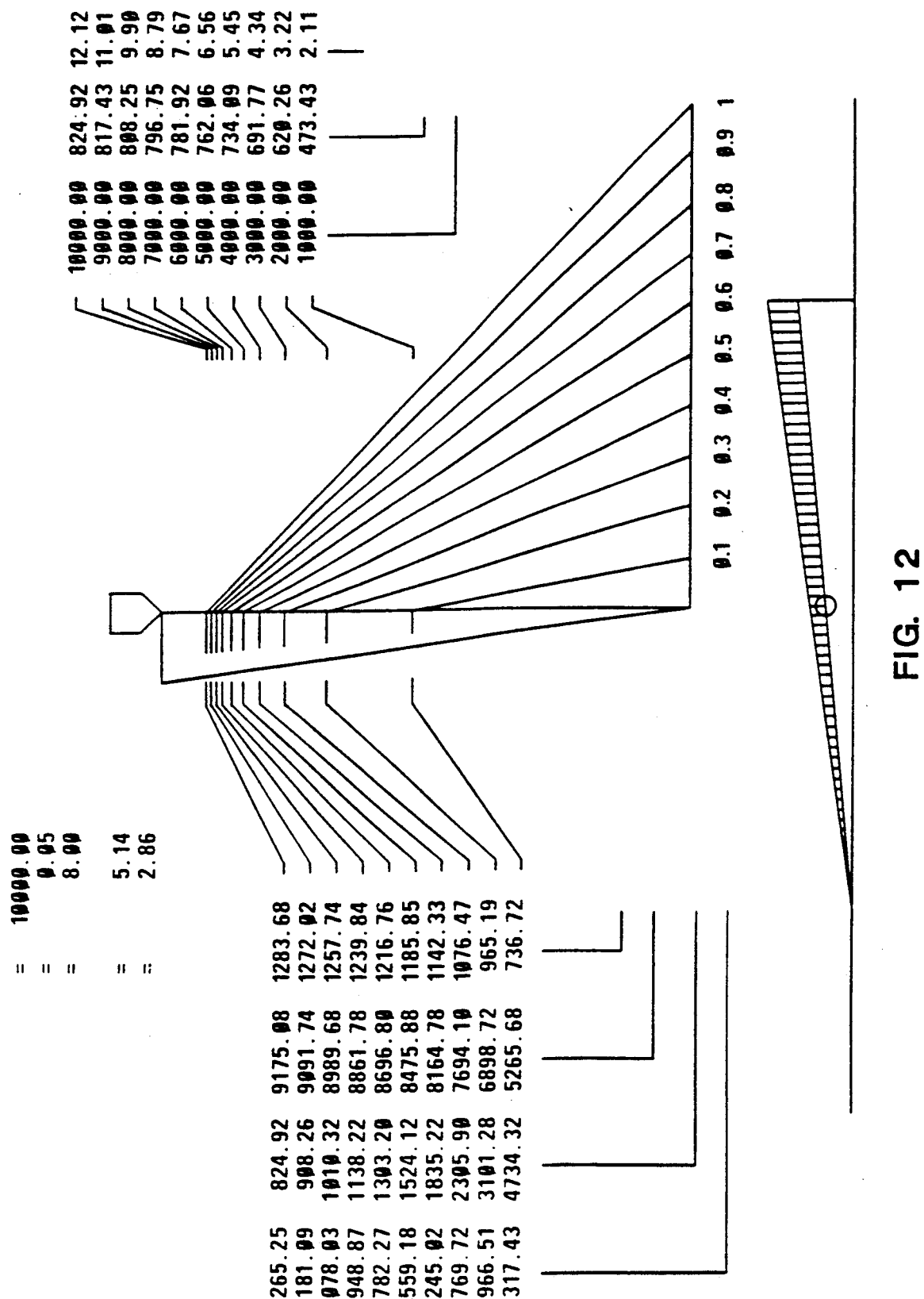
FIG. 12 is a graph showing an influence off ground friction on the sliding-step process.

FIG. 12 shows an example graphically for the development of an active wedge 126 with the passive angle part 127 (self-locking wedge bearing) and active angle part 128, as well as the influence of the coefficients of friction on the load rest 129 and the H-factor 130 resulting therefrom as reduction in friction upon the sliding step.

Figure 13:
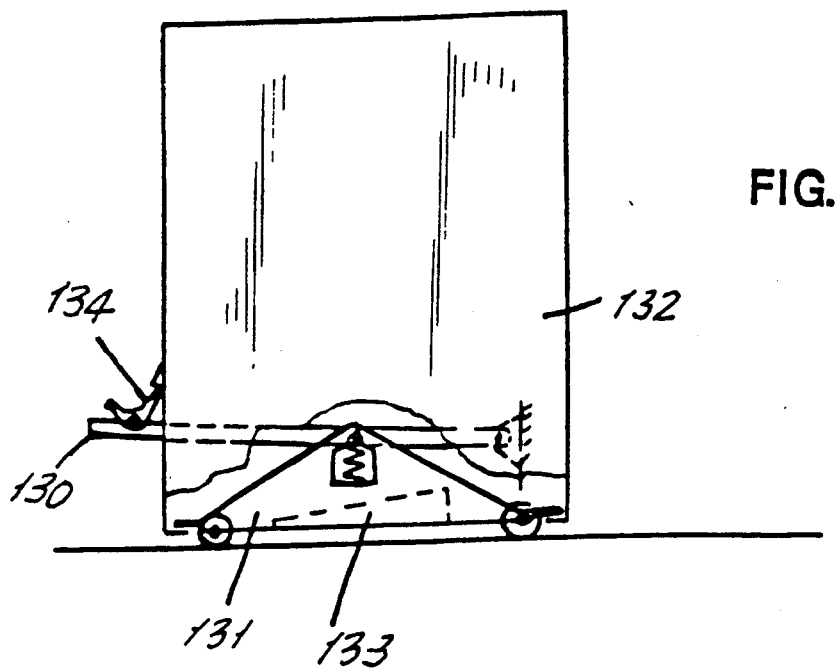
FIG. 13 shows an example of the mechanical switching of a load to free running on wheels.

FIG. 13 shows a load 132 which can be shifted onto the wheel chassis 131 via a lever 130. The active wedge 133 can, in this case, couple pulse-wise with the floor or in case of manual advance remain entirely passive. The locking 134 secures the elevated condition.

The free-travel condition can also be effected pneumatically, electromagnetically as well as with constant spring tension—adapted to the load remaining on the floor upon sliding.

Figure 14:
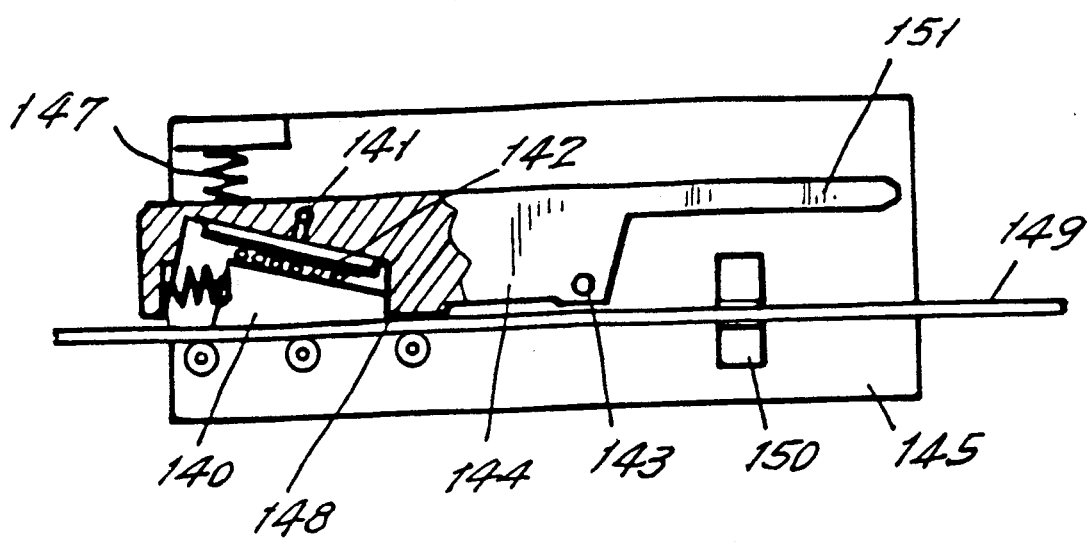
FIG. 14 is an advancing device with lever arm for manual opening or pushing back.

FIG. 14 shows a step advance device with the active wedge 140, actuated stepwise via pressure-fluid connection 141 and force cell 142 guided in a part 144 which is pivotally fastened to the shaft 143. The base plate 145 bears, in addition to the shaft 143, the tensioning spring 147 which presses the brake part 148 against the guide rollers 146 on the part 149 to be pushed forward.

For a position report of the part 149 to be displaced, light barriers 150 with optical raster can be used. The free travel phase can be obtained by pressing on the lever 151. The same lever can serve for the pushing back of the part 149.

Figure 15:
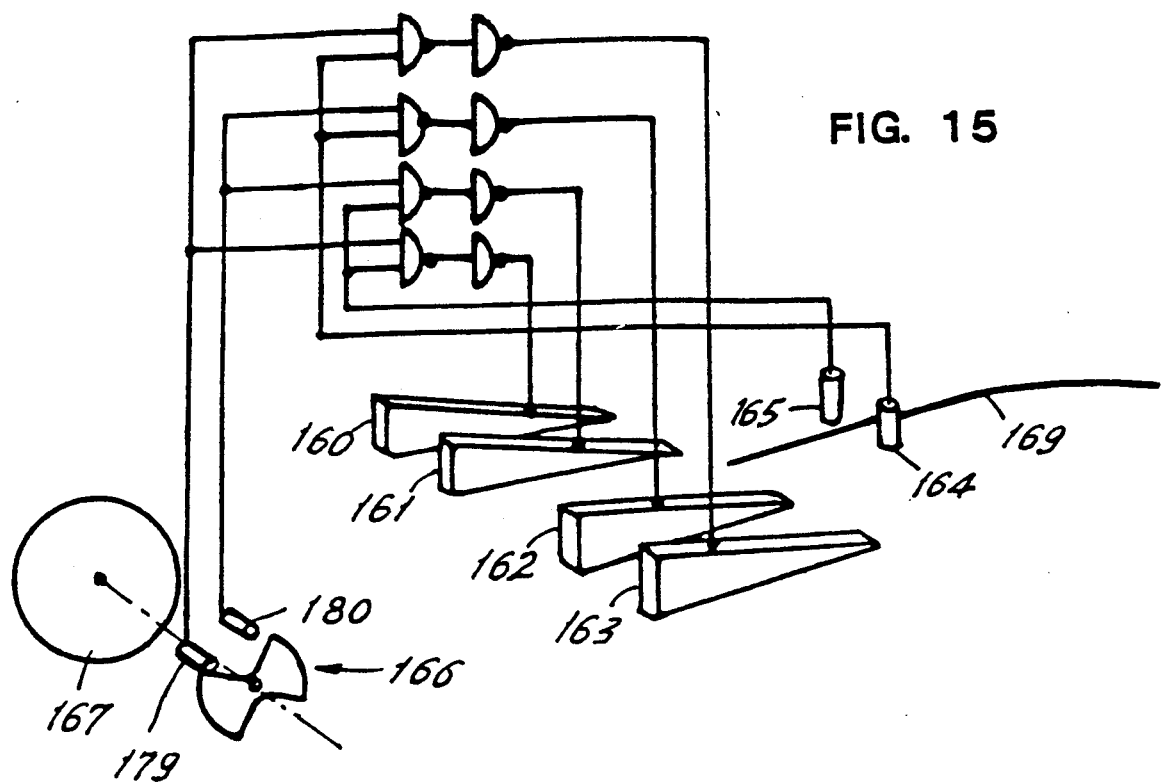
FIG. 15 shows an example of the arrangement of function parts for automatically controlled chassis.

FIG. 15 shows the logical coupling and the arrangement of the active wedges 160, 161, 162, 163 in the case of a chassis for continuous movement and path guidance, for instance by inductive sensors 164, 165.

After a commencement of movement—for instance by the turning on of the pressure fluid—there takes place a continuous forward travel in the manner that, via the friction wheel 167 resting on the floor, the pulse transmitter 166 alternately controls pressure fluid to the inner pair 161, 162 or outer pair 160, 163 of the active wedges during the movement in direction 168. In the case of curvature of the guide path 169 the sensors 164, 165 effect the shortening of the instantaneous active step on the inside of the curve.

The logical coupling can, for example, be developed, as shown, by eight AND/NOT members 171 (for instance 2×CMOS 4011). The advisable Schmitt trigger or OP amplifier for the forming of the optoelectronic signals of the light barriers 179, 180 as well as the power transistors and valves at the outputs 181 are not shown.

The figure shoes the simplicity of an automatically controllable chassis with active wedge due to their binary properties. Such as arrangement can be steered, controlled or positioned by light (IR, laser), audio frequencies, or inductive or Hall sensors directly or via microprocessor.

Figure 16:
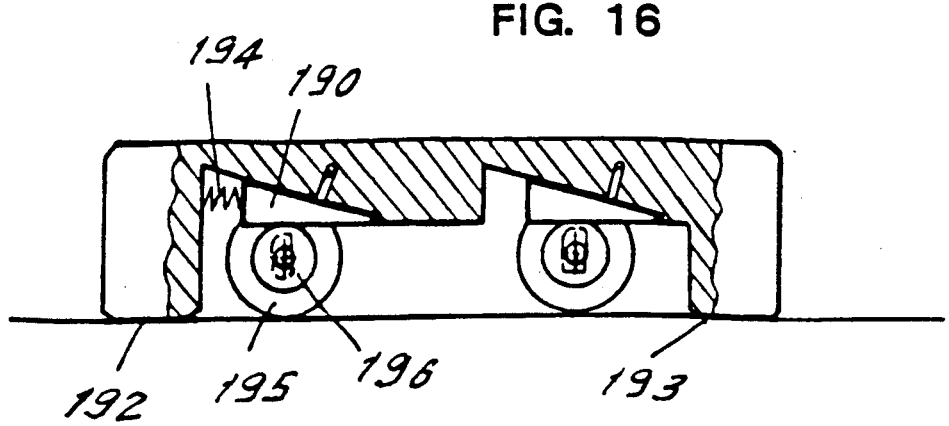
FIG. 16 is an example for the automatic free-running function.

FIG. 16 shows an embodiment of a chassis in which the active wedge 190 acting via the wheel which is guided, for instance, in slots, can effect the removal of the ground friction on the resting surfaces 191, 193 for position of rest, up to free travel. The extent of the taking over of the load on the wheels during the advancing phase is effected by the pretensioning spring 194. A stepping up of the speed of travel is effected by the ratio of the diameters of the travel wheel 195 and friction wheel 196.

FIGS. 17(a) and 17(b) show conveyor path module of reversible direction in a sectional drawing, it consisting of housing part 201, driver part 202 with coaxially arranged rollers 203, 204, 205, 206, of which the outer rollers 203, 206 are for the limiting of the vertical stroke and the inner rollers 204, 205 for producing the thrust movement 207 in the direction 208, insofar as the cam part 209 is raised by the hose cell 210.

The thrust part is centered in position of rest by the springs 211 and 212 on the coupling bar 213. The relative displacement of the cam part 209 with respect to the rollers by a distance 214 determines the direction of advance.

In non-reversible embodiments, the cam part contains travel surfaces inclined only in one direction.

FIG. 18 shows an example of a suitable tying-off of the hose cell by clamping part 220 which holds the hose end 222 closed by seal 221 pressed together with the base part 223. The hose cell which is partially cemented to the brake part permits the pressure fluid connection 225.

FIG. 19 shows as example a transportable triple conveyor path 230 which, if necessary, can be laid or inserted between the supports 231 in order to move a load.

Similar supports can be formed by the rollers 232 of a roller path, shown in FIG. 19(a), in which a conveyor path which is mounted or inserted in between permits a transverse removal of the loads.

Conveyor systems of similar type are particularly suitable for the construction of systems for transfer of goods. They form a comprehensive compatible active conveyor surface which can be widened as desired for one-dimensional or two-dimensional movement and positioning of loads such as, for instance, pallets and containers. They are suitable for trucks, platform lifts, elevators, trains, skids, airplanes and consigning vehicles. For the construction of systems for the sorting of packages, distribution and consigning in post offices, railway stations, airports and warehouses, as well as for the conveying of products in operations within a factory.

Figure 20:
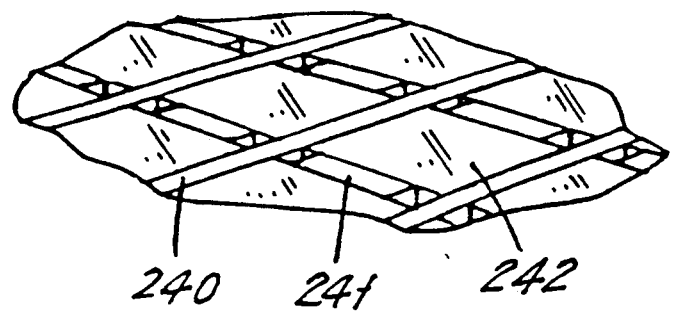
FIG. 20 shows conveyor paths arranged crosswise.

FIG. 20 shows a crossed arrangement of the drivers 240 and 241 with the intermediate resting surfaces 242 for the position of rest.

By the optional control of the conveyor devices loads can be fed, distributed or commissioned in the horizontal plane, for instance in accordance with Cartesian coordinates.

Figure 21:
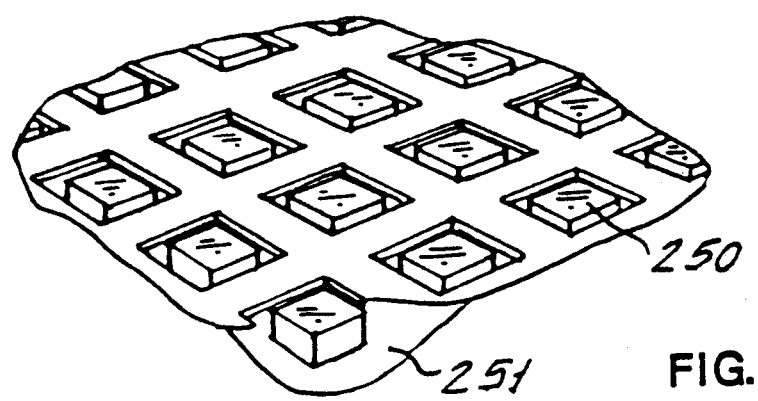
FIG. 21 shows a grid-like arrangement of the driver parts.

FIG. 21 shows the raster-like arrangement of the driver surfaces 250 which can be moved by a support plate 251 in any desired direction of conveyance.

Figure 22:
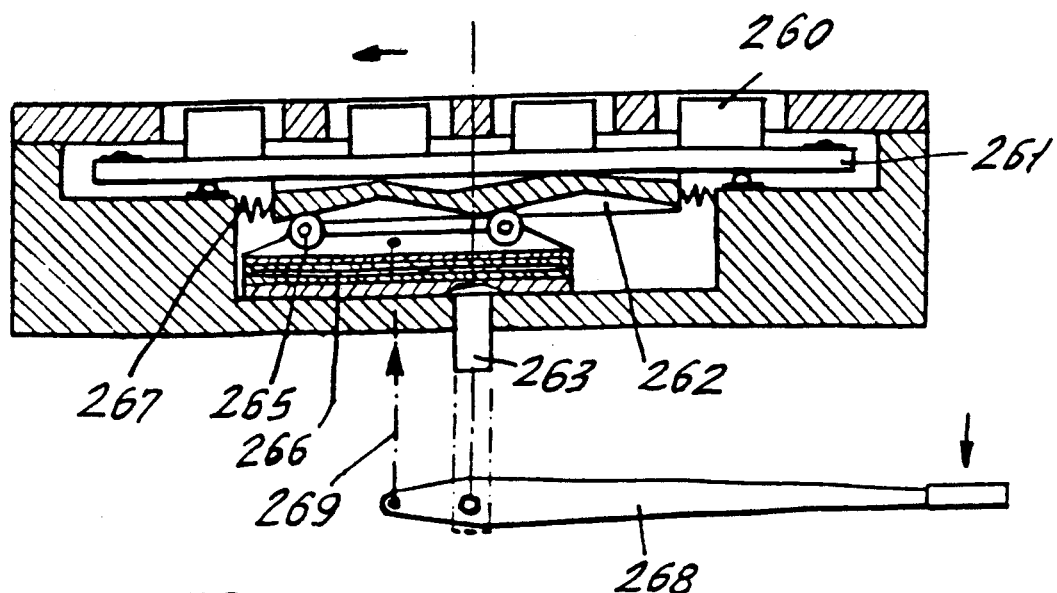
FIG. 22 shows a drive of a conveyor device having drivers arranged in grid form.

FIG. 22 shows an embodiment for the drive of a conveyor device with driver surfaces 260 arranged in grid form, fastened to plate 261 on the bottom of which a double conical cam surface 262 can be moved radially outward by a drive part 264 with rollers 265 and work cell 266 which is mounted for turning around a pin 263, against the centering spring 267.

A mechanical actuation as alternative is indicated by hand lever 268 and coupling element 269.

With an eccentric arrangement of similar drive parts, such conveyor devices with raster-like or segment-shaped arrangement of the drivers can also effect a controlled stepwise turning of the load.

I claim:

1. A drive device for conveying a load in a predetermined forward direction which is opposite to a predetermined backward direction, said device comprising:

a support platform with an upward-facing side for supporting said load and a downward-facing bottom side;

an inclined ramp connected to and defining an angle of incline with respect to said support platform, said ramp having a bottom side facing generally downward and generally backward;

lift means which is locatable below said ramp and which is operable for moving upward against said downward-facing ramp side to provide a generally upward lift against said downward-facing ramp side; and means for providing a low coefficient of friction between said downward-facing ramp side and said upwardly movable lift means, thereby permitting said ramp and support platform to move freely in said predetermined forward conveying direction when said lift means is moved upward against said bottom ramp side, without requiring said lift means to move in either said forward or said backward direction.

2. A drive device as in claim 1, for conveying such load with respect to a floor, wherein said support platform is part of a support body with a bottom portion disposed for contacting said floor, when said lift means is not operated to lift said ramp upward;

said bottom portion being slightly lifted with respect to the floor when said lift means is operated, thereby reducing friction between said bottom portion and said floor, while allowing said support platform to remain substantially parallel to said floor surface; and said ramp being an integral part of said support body; and said lift means, when disposed under said ramp, and when operated, at least partially lifts said bottom portion of said support body with respect to said floor; and moves said support body and said load forward.

3. A drive device as claimed in claim 2, further comprising a second ramp connected to said support platform, said second ramp having a bottom side facing generally downward and generally forward; said lift means further being locatable below said second ramp.

4. A drive device as claimed in claim 1, further comprising a second ramp connected to said support platform, said second ramp having a bottom side facing generally downward and generally forward; said lift means further being locatable below said second ramp.

5. A carrying device for carrying a load in a forward direction, which is opposite to a predetermined backward direction, across a floor surface, said device comprising:
   (a) a body which includes:
      (1) a support platform for supporting said load; and
      (2) an inclined ramp connected to and defining an angle of incline with respect to said support platform, said ramp having a bottom side facing generally downward and generally backward; and
   (b) lifting means which is locatable between said floor surface and said bottom ramp side, and which can be operated to move generally upward and contact said downward-facing bottom ramp side, thereby lifting said body slightly with respect to said floor surface while allowing said support platform to remain substantially parallel to said floor surface, and thereby reducing the friction between said body and said floor surface, when said lifting means is operated; and
   (c) means for providing a low coefficient of friction between said downward-facing ramp side and said upwardly movable lifting means, so that said body is permitted to move forward when said lifting means is operated, without requiring said lifting means to move either forward of backward.

6. A device as in claim 5, wherein said means for providing a low coefficient of friction, between the bottom ramp side and the lifting means, comprises roller means for providing a rolling interface therebetween.

7. A device as in claim 6, wherein said roller means comprises a roller at an upper part of said lifting means which contacts said downward-facing ramp side when said lifting means is moved upward.

8. A device as in claim 7, wherein said lifting means comprises a generally V-shaped lever having said roller at one end thereof, and a handle at the other end thereof, and defining an intermediate pivot point, so that when the pivot point is resting on the floor surface and the handle is moved downward, the roller moves upward and thereby lifts said ramp.

9. A device as in claim 8, wherein said body has two spaced ramps and said lifting means has two corresponding generally V-shaped levers, each having a roller at one end thereof a handle at the other end thereof.

10. A device as in claim 9, wherein said two handles are interconnected for being constrained to move downward together.

11. A device as in claim 9, wherein said support platform is a surface integrally interconnected in said two ramps.

12. A carrying device as claimed in claim 5, wherein said body further includes a second ramp connected to said support platform, said second ramp having a bottom side facing generally downward and generally forward, and said lifting means being locatable on said floor surface and below said second ramp bottom side.

* * * * *